United States Patent
Birdi et al.

(10) Patent No.: US 8,760,014 B2
(45) Date of Patent: Jun. 24, 2014

(54) ENHANCED SPRAY COOLING TECHNIQUE FOR WEDGE COOLING

(75) Inventors: Balwinder Singh Birdi, Tucson, AZ (US); Simon Waddell, Oro Valley, AZ (US); William Scherzinger, Oro Valley, AZ (US); Wayne Pearson, Oro Valley, AZ (US); David Kane, Oro Valley, AZ (US); Tom Phielix, Tucson, AZ (US)

(73) Assignee: Honeywell International Inc., Morristown, NJ (US)

( * ) Notice: Subject to any disclaimer, the term of this patent is extended or adjusted under 35 U.S.C. 154(b) by 364 days.

(21) Appl. No.: 13/182,248

(22) Filed: Jul. 13, 2011

(65) Prior Publication Data

US 2013/0015730 A1  Jan. 17, 2013

(51) Int. Cl.
*H02K 9/00* (2006.01)

(52) U.S. Cl.
USPC .............................................. 310/54; 310/64

(58) Field of Classification Search
USPC ........................... 310/52, 54, 58, 59, 61, 64
See application file for complete search history.

(56) References Cited

U.S. PATENT DOCUMENTS

| | | | | |
|---|---|---|---|---|
| 3,459,979 | A * | 8/1969 | Carew et al. | 310/54 |
| 4,514,652 | A | 4/1985 | Olson | |
| 4,728,840 | A * | 3/1988 | Newhouse | 310/113 |
| 5,140,204 | A | 8/1992 | Cashmore et al. | |
| 5,682,074 | A * | 10/1997 | Di Pietro et al. | 310/215 |
| 6,113,024 | A * | 9/2000 | Pittard et al. | 242/433 |
| 6,879,069 | B1 * | 4/2005 | Weidman et al. | 310/61 |
| 7,786,630 | B2 * | 8/2010 | Waddell et al. | 310/58 |
| 7,839,031 | B2 * | 11/2010 | Tilton et al. | 310/54 |
| 2010/0320850 | A1 | 12/2010 | Lemmers, Jr. et al. | |

* cited by examiner

*Primary Examiner* — Hanh Nguyen
(74) *Attorney, Agent, or Firm* — Shimokaji & Assoc., P.C.

(57) ABSTRACT

A wedge cooling apparatus and method for cooling a rotating machine, such as a generator, disperses a spray of cooling fluid into the wedges of the generator. The spray cooling method results in a high heat transfer coefficient of about 2000-3000 W/m²C as opposed to conventional conduction cooling, which has a heat transfer coefficient of about 200-300 W/m²C. The apparatus and method of the present invention efficiently removes heat from high powered, high current density designed generators.

5 Claims, 4 Drawing Sheets

ENHANCED SPRAY COOLING TECHNIQUE FOR WEDGE COOLING

BACKGROUND OF THE INVENTION

The present invention relates to apparatus and methods for heat removal and, more particularly, apparatus and methods for spray cooling a wedge of a generator rotor.

Heat removal in conduction cooling depends on the thickness of the conductive media. If the thickness of the conductive material can be reduced, heat removal is improved.

In generators, electromagnetic losses occur in the magnetic iron and the copper. These losses result in production of heat which must be removed to maintain overall temperature below that allowable for the copper coating and the insulation used in the construction of the generators. The rotor core, which is made of magnetic iron, can be conduction cooled by flowing fluid through the rotor shaft. However, the removal of heat from copper is better managed if oil is passed through the hollow wedges. Due to lower thermal resistance, the flow of fluid in the vicinity of copper is much more effective in removing heat from the copper and in keeping the overall temperature below the allowable limit. This is done with conduction mode of heat removal.

Since the heat transfer coefficient (HTC) depends upon the velocity of the fluid, the removal of heat is not very efficient and a very high flow is needed to create a reasonable HTC for conduction cooling. Further, because the rotor is a rotating component, having a large amount of fluid at a radius away from the rotor shaft is not desirable, especially for high powered larger diameter and high speed machines.

As can be seen, there is a need for an apparatus and method for heat removal from a rotating machine, such as a generator.

SUMMARY OF THE INVENTION

In one aspect of the present invention, a spray cooling manifold comprises a manifold ferrule adapted to circumscribe a shaft of a rotating machine; a manifold pipe having a bend of about 90 degrees having a first end attached to the manifold ferrule and a second, opposite end; a cooling fluid channel running from an inside surface of the manifold ferrule to the second, opposite end of the manifold pipe; and a spray delivery device disposed at the second, opposite end of the manifold pipe.

In another aspect of the present invention, a rotating machine rotor comprises a shaft; a plurality of coils disposed on the shaft; a plurality of wedges disposed between the coils; bands securing the wedges on the rotor; and a manifold comprising a manifold ferrule adapted to circumscribe the shaft; a plurality of manifold pipes, each having a bend of about 90 degrees, each having a first end attached to the manifold ferrule and a second, opposite end attached to the wedges; a cooling fluid channel running from an inside surface of the manifold ferrule to the second, opposite end of the manifold pipe; and a spray delivery device disposed at the second, opposite end of the manifold pipe, the spray delivery device adapted to deliver a spray of cooling fluid into the plurality of wedges.

In a further aspect of the present invention, a cooling system through which a cooling medium can be circulated for dissipating heat from a rotating machine comprises a shaft adapted to be rotated and having an axial bore through the cooling medium can be circulated; a plurality of coils disposed on the shaft; a plurality of wedges disposed between the coils; bands securing the wedges on the rotor; and a manifold comprising a manifold ferrule adapted to circumscribe the shaft; a plurality of manifold pipes, each having a first end attached to the manifold ferrule and a second, opposite end attached to the wedges; and a plurality of cooling fluid channels running from an inside surface of the manifold ferrule to the second, opposite end of each manifold pipe; and a spray delivery device disposed at the second, opposite end of each manifold pipe, the spray delivery device adapted to deliver a spray of cooling fluid into the plurality of wedges.

These and other features, aspects and advantages of the present invention will become better understood with reference to the following drawings, description and claims.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Various inventive features are described below that can each be used independently of one another or in combination with other features.

Broadly, embodiments of the present invention provide a wedge cooling apparatus and method for cooling a rotating machine, such as a generator. The method disperses a spray of cooling fluid into the wedges of the generator. The spray cooling method results in a high heat transfer coefficient of about 2000-3000 W/m$^2$C as opposed to conventional conduction cooling, which has a heat transfer coefficient of about 200-300 W/m$^2$C. The apparatus and method of the present invention efficiently removes heat from high powered, high current density designed generators.

Figure 1:
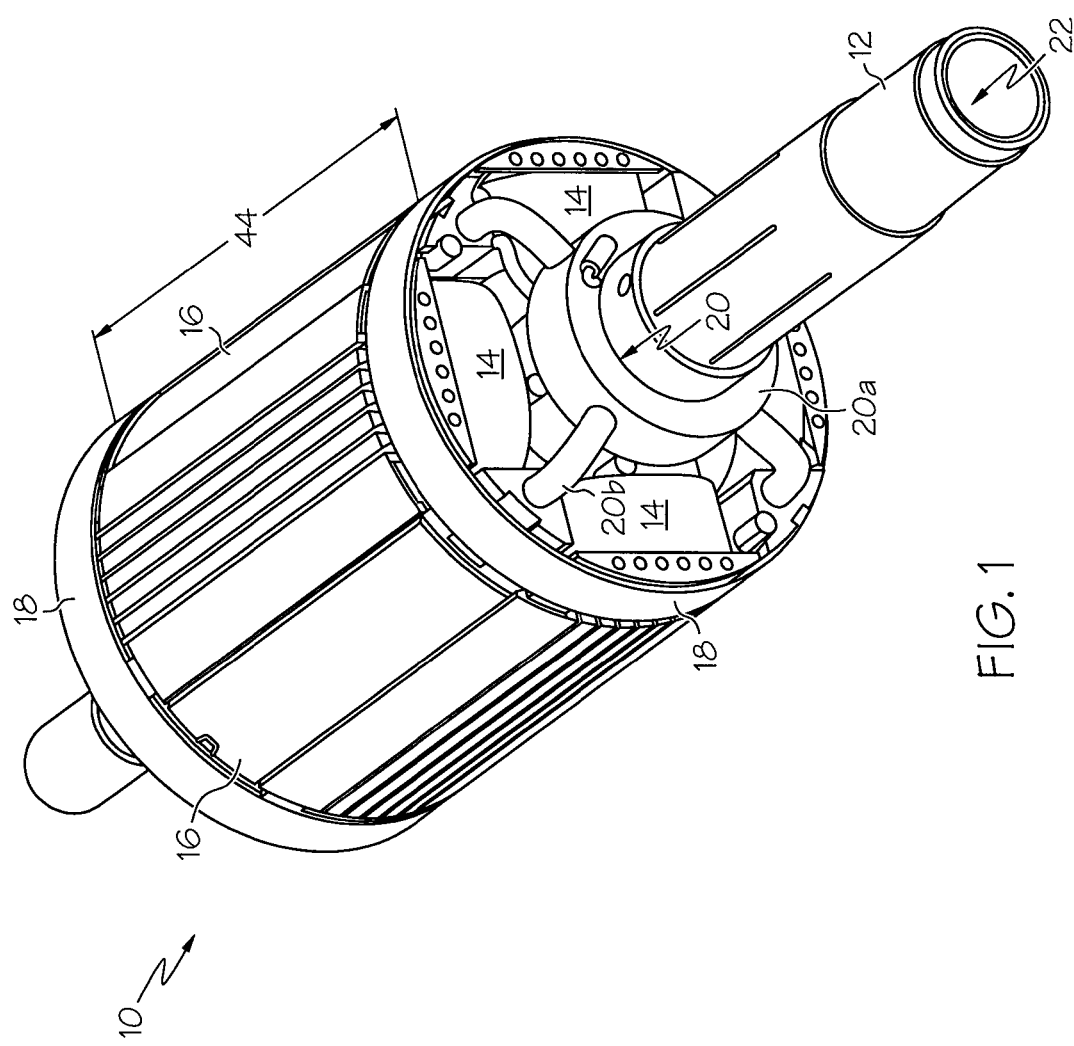
FIG. 1 is a perspective view of a rotating machine rotor showing a fluid manifold and wedge support according to an exemplary embodiment of the present invention.

Referring to FIG. 1, there is shown a rotor 10 having a shaft 12 and a plurality of windings 14 disposed about the shaft 12. Wedges 16 may be disposed between the windings 14. A band 18 may be used to help secure the wedges 16 to the rotor 10. A manifold 20 may fluidly interconnect an interior 22 of the shaft 12 with the wedges 16. The manifold 20 may include a manifold ferrule 20a, that may circumscribe the shaft 20 and a plurality of manifold pipes 20b.

Figure 2:
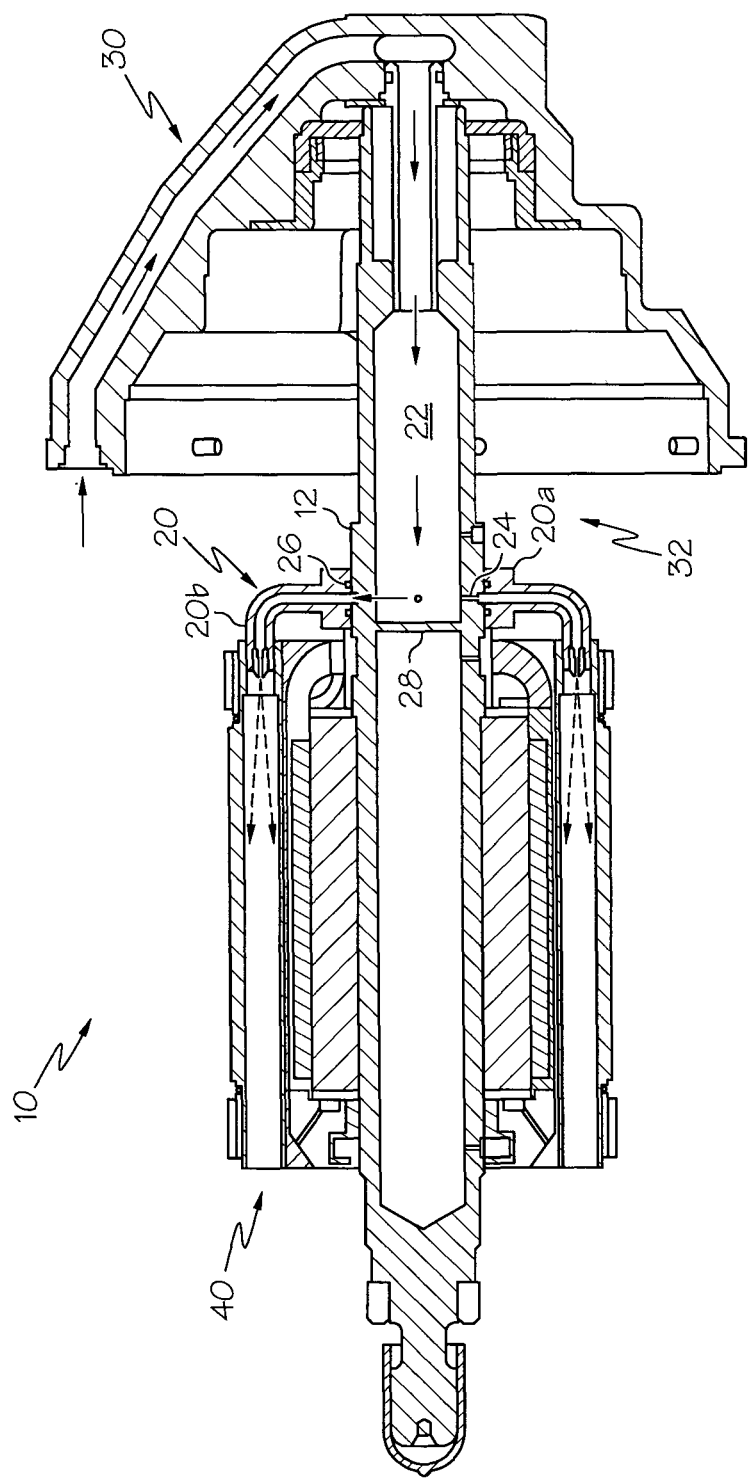
FIG. 2 is a cross-sectional view of the rotating machine rotor of FIG. 1.
Figure 3:
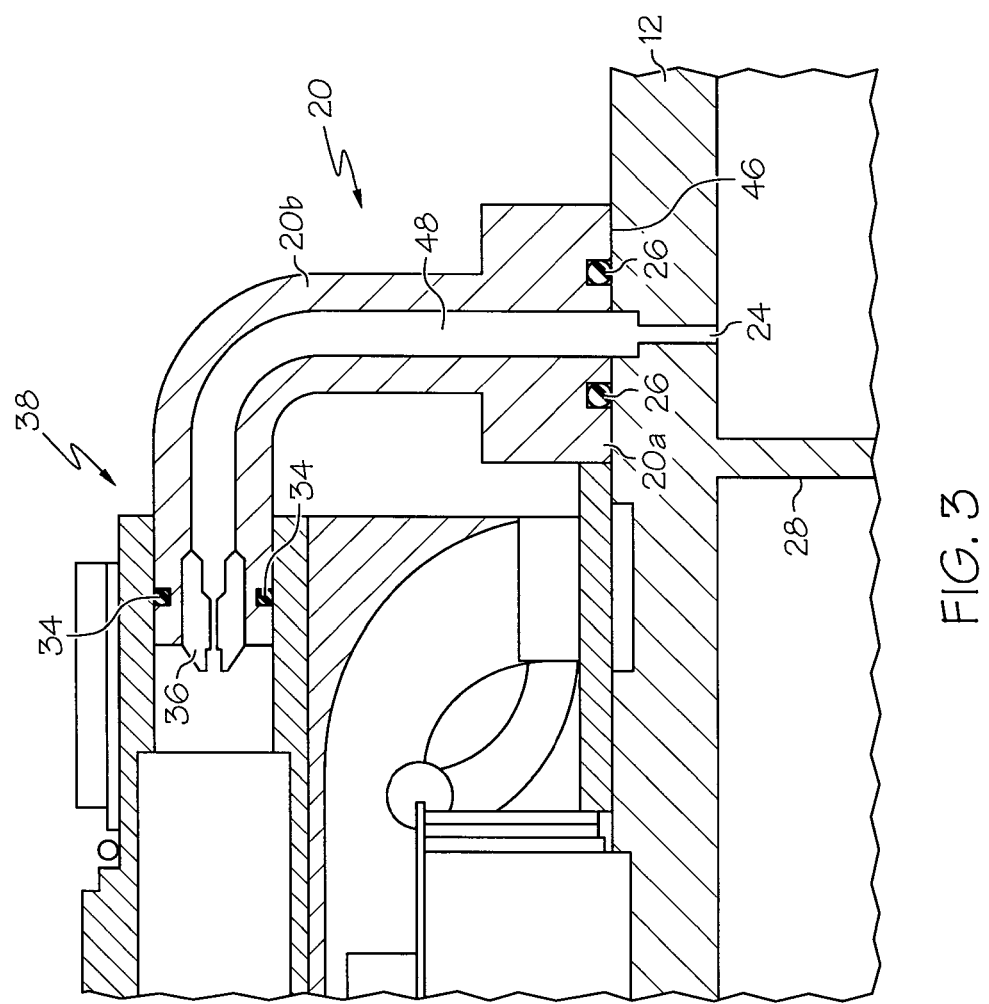
FIG. 3 is close up cross-sectional view of a portion of the rotating machine of FIG. 1.

Referring now to FIGS. 2 and 3, the shaft 12 may include a through hole 24 fluidly interconnecting the interior 22 of the shaft 12 with a cooling channel 48 of the manifold 20. The cooling channel 48 may run from an inside surface 48 of the manifold ferrule 20a to a wedge end 38 of the manifold pipe 20b. O-rings 26, typically made of a rubber of a suitable durometer to prevent leakage under high pressure due to centrifugal force, may be used to seal the manifold ferrule 20a to the shaft 12. The o-rings 26 may include first and second o-rings running about the inside surface 46 of the manifold ferrule 20a. A shaft plug 28 may be used to divert cooling fluid, such as oil, from the shaft 12, through the through hole 24, and into the manifold 20. The shaft 12 may receive shared oil from a gearbox (not shown) via an end bell 30 of the rotor 10. In the embodiments shown in FIG. 2, the manifold 20 is disposed on a anti-drive end 32 of the rotor 10.

The manifold pipes 20b may turn about 90 degrees to deliver the cooling fluid from the manifold ferrule 20a to the wedges 16. Wedge o-rings 34 may seal the manifold 20 with the wedges 16.

A spray delivery device, such as a spray nozzle 36, may be disposed on a wedge end 38 of the manifold 20. The spray nozzle 36 may delivery a spray of cooling fluid inside the wedges 16. The pressure of the fluid delivered to the spray nozzle 36 may have a high pressure due to centrifugal forces on the cooling fluid. The cooling fluid sprayed into the wedges 16 may exit from an open end 40 (drive end) of the wedges 16. In some embodiments, the design of the spray nozzle 36 may be configured to minimize hot spots in the middle of the rotor 10 by directing the spray at a particular location along the length of the wedge 16. The design of the spray nozzle 36 (such as nozzle inside diameter), along with the pressure and volume of cooling fluid, may be used to control the cooling of the wedges 16.

Figure 4:
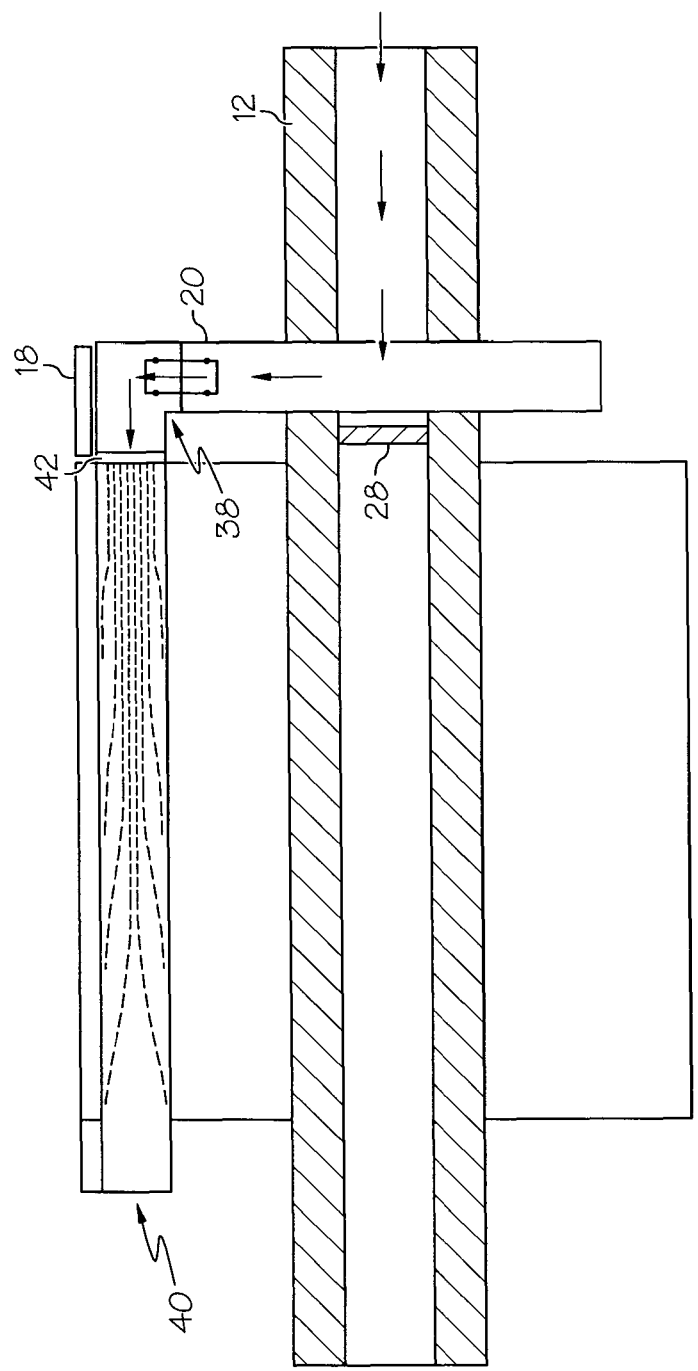
FIG. 4 is a cross-sectional schematic view of a rotating machine according to an alternate embodiment of the present invention.

Referring now to FIG. 4, in which like numerals represent like elements from FIGS. 1 through 3, in place of the spray nozzle 36 (see FIG. 3), the spray delivery device may be a sieve 42 disposed at the wedge end 38 of the manifold 20. The sieve 42 may have a plurality of passages (not shown) from about 0.030 inch to about 0.040 inch, for example. The sieve may be made from, for example, a metal material, such as aluminum, titanium, or the like, sintered glass, or the like, having the plurality of passages formed therethrough.

The manifold 20 may be designed for various types of rotors 10. For example, the manifold 20 may be designed to deliver cooling fluid to a rotor having four wedges 16, as shown in FIG. 1. Other rotors, including 4, 6 and 8 pole rotors, may be similarly cooled.

The spray cooling method described herewithin is particularly adapted for use in rotors having a wedge length 44 from about 2 to about 4 inches. Typically, the spray cooling method described herewithin may be used to adequately cool a generator rotor that is less than about 3.5 inches.

It should be understood, of course, that the foregoing relates to exemplary embodiments of the invention and that modifications may be made without departing from the spirit and scope of the invention as set forth in the following claims.

We claim:

1. A cooling system through which a cooling medium can be circulated for dissipating heat from a rotating machine, comprising:
   a shaft adapted to be rotated and having an axial bore through which the cooling medium can be circulated;
   a plurality of coils disposed on the shaft;
   a plurality of wedges disposed between the coils; and
   a manifold comprising a manifold ferrule adapted to circumscribe the shaft; a plurality of manifold pipes, each having a first end attached to the manifold ferrule and a second, opposite end attached to the wedges; and a plurality of cooling fluid channels running from an inside surface of the manifold ferrule to the second, opposite end of each manifold pipe; and a spray delivery device disposed at the second, opposite end of each manifold pipe, the spray delivery device adapted to deliver a spray of cooling fluid into the plurality of wedges.

2. The cooling system of claim 1, further comprising:
   at least one wedge o-ring disposed about the second, opposite end of each manifold pipe; and
   first and second o-rings disposed on the inside surface of the manifold ferrule.

3. The cooling system of claim 1, wherein the spray delivery device is a spray nozzle or a sieve.

4. The cooling system of claim 1, further comprising a plurality of through holes in the shaft, the through holes fluidly communicating with the cooling fluid channels of the manifold.

5. The cooling system of claim 1, further comprising a shaft plug adapted to divert the cooling fluid into the plurality of through holes.

\* \* \* \* \*